(12) United States Patent
Miura et al.

(10) Patent No.: US 12,470,790 B2
(45) Date of Patent: Nov. 11, 2025

(54) PANHEAD AND IMAGE PICKUP APPARATUS THAT ARE CAPABLE OF ACHIEVING COST REDUCTION AND MINIATURIZATION

(71) Applicant: CANON KABUSHIKI KAISHA, Tokyo (JP)

(72) Inventors: Atsushi Miura, Kanagawa (JP); Masaru Tomabechi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 18/510,821

(22) Filed: Nov. 16, 2023

(65) Prior Publication Data

US 2024/0179387 A1   May 30, 2024

(30) Foreign Application Priority Data

Nov. 28, 2022   (JP) ................................ 2022-189307

(51) Int. Cl.
*H04N 23/52*   (2023.01)
*H04N 7/18*    (2006.01)
(Continued)

(52) U.S. Cl.
CPC ............. *H04N 23/52* (2023.01); *H04N 7/183* (2013.01); *H04N 23/695* (2023.01); *H04N 23/54* (2023.01); *H04N 23/66* (2023.01)

(58) Field of Classification Search
CPC ...... H04N 23/52; H04N 23/695; H04N 7/183; H04N 23/66; H04N 23/54
(Continued)

(56) References Cited

U.S. PATENT DOCUMENTS 8,591,657 B2 * 11/2013 Nakada ............... C23C 16/4401
                                                          118/730
9,759,582 B2 *  9/2017 Kawano ................. B62D 5/049
(Continued)

FOREIGN PATENT DOCUMENTS

JP        4916726 B2      4/2012
JP      2013-34043 A      2/2013
(Continued)

OTHER PUBLICATIONS

Japanese Office Action issued Oct. 1, 2024 during prosecution of related Japanese application No. 2022-189307 (English-language translation not included.).

*Primary Examiner* — Matthew David Kim
(74) *Attorney, Agent, or Firm* — VENABLE LLP

(57) ABSTRACT

A panhead capable of achieving cost reduction and miniaturization is provided. The panhead including a fixed portion and a movable portion that is equipped with an image pickup unit and is movable together with the image pickup unit with respect to the fixed portion includes a first communication section configured to include a first moving-rotationally portion that communicably connects the fixed portion side and the movable portion side and, when the movable portion moves, is able to move rotationally, and a second communication section configured to include a second moving-rotationally portion that communicably connects the fixed portion side and the movable portion side in a non-contact state and, when the movable portion moves, is able to move rotationally around the same axis as the first moving-rotationally portion. The second moving-rotationally portion includes a hollow portion in which at least a portion of the first moving-rotationally portion is disposed.

11 Claims, 5 Drawing Sheets

(51) Int. Cl.
*H04N 23/695* (2023.01)
*H04N 23/54* (2023.01)
*H04N 23/66* (2023.01)

(58) Field of Classification Search
USPC .......................................................... 348/143
See application file for complete search history.

(56) References Cited

U.S. PATENT DOCUMENTS

| | | | | |
|---|---|---|---|---|
| 10,969,515 | B2* | 4/2021 | Ihab | G01V 5/226 |
| 2007/0182827 | A1* | 8/2007 | Sassa | G08B 13/19619 |
| | | | | 348/E5.025 |
| 2012/0103111 | A1* | 5/2012 | Baller | G01L 3/102 |
| | | | | 324/173 |
| 2015/0219946 | A1* | 8/2015 | Satoh | G02B 26/0841 |
| | | | | 359/290 |
| 2017/0048457 | A1* | 2/2017 | Eguchi | H04N 23/66 |
| 2017/0164910 | A1* | 6/2017 | Cao | A61B 6/4275 |
| 2017/0290555 | A1* | 10/2017 | Iniewski | H03K 23/40 |
| 2018/0063432 | A1* | 3/2018 | Wada | H04N 23/66 |
| 2018/0073306 | A1* | 3/2018 | Verhoef | E21B 47/12 |
| 2018/0125590 | A1* | 5/2018 | Giordano | A61B 17/320092 |
| 2018/0191404 | A1* | 7/2018 | Berger | H04B 5/26 |

FOREIGN PATENT DOCUMENTS

| | | | | |
|---|---|---|---|---|
| JP | 2015-61230 A | | 3/2015 | |
| JP | 2015170936 A | * | 9/2015 | ............... H01Q 1/24 |

* cited by examiner

PANHEAD AND IMAGE PICKUP APPARATUS THAT ARE CAPABLE OF ACHIEVING COST REDUCTION AND MINIATURIZATION

BACKGROUND OF THE INVENTION

Field of the Invention

The present invention relates to a panhead and an image pickup apparatus.

Description of the Related Art

Surveillance cameras are conventionally known as an application example of image pickup apparatuses. The surveillance camera includes an image pickup unit that picks up an image, and a rotation drive mechanism that turns the image pickup unit. In addition, some of the surveillance cameras include the rotation drive mechanism that turns the image pickup unit in a pan direction (around a vertical axis) without limitation. As a result, it is possible to secure a 360° image pickup range around the surveillance camera. In such surveillance cameras capable of performing an unlimited turning, a slip ring may be used as an electrical module capable of transmitting image signals (electrical signals) from the image pickup unit regardless of a turning angle of the image pickup unit. For example, the slip ring has a cylindrical shape, and includes a stationary body having a large number of terminals, a large number of brush terminals that contact the large number of terminals of the stationary body, respectively, and a rotating body that is supported so as to move rotationally inside the stationary body. Further, in the case that the slip ring is used for image signal transmission, each terminal of the slip ring is often made of noble metal such as gold in consideration of durability during transmission and high-quality signal transmission. Therefore, for example, as the number of the terminals increases and the size of the terminals (the slip ring) increases, the manufacturing cost of the slip ring tends to increase. In particular, in the case that the slip ring is used to transmit high-speed video signals such as serial digital interface (SDI) signals, there is a concern that the manufacturing cost of the slip ring will further increase.

Therefore, in a signal transmission device disclosed in Japanese Laid-Open Patent Publication (kokai) No. 2013-34043, in addition to a signal transmission method using a slip ring, an optical transmission method using optical coupling is used in combination to suppress an increase in the manufacturing cost of the slip ring. In addition, in a camera device disclosed in Japanese Patent No. 4916726, in addition to a signal transmission method using a slip ring, a signal transmission method using a waveguide is used in combination to suppress an increase in the manufacturing cost of the slip ring.

However, in the signal transmission device disclosed in Japanese Laid-Open Patent Publication (kokai) No. 2013-34043, it is necessary to make the slip ring hollow and to insert a signal transmission line for optical transmission using the optical coupling into the hollow portion. Similarly, in the camera device disclosed in Japanese Patent No. 4916726, it is also necessary to make the slip ring hollow (perform hollowing of the slip ring) and to insert a signal transmission line for signal transmission using the waveguide into the hollow portion. In addition, in any one of the signal transmission device disclosed in Japanese Laid-Open Patent Publication (kokai) No. 2013-34043 and the camera device disclosed in Japanese Patent No. 4916726, since the slip ring has a hollow shape, there is a problem in that the size (an outer diameter) of the slip ring will increase, in other words, there is a problem that the slip ring will become larger. Furthermore, as described above, the larger slip ring also has the problem of increasing the manufacturing cost of the slip ring.

SUMMARY OF THE INVENTION

The present invention provides a panhead and an image pickup apparatus that are capable of achieving cost reduction and miniaturization.

Accordingly, the present invention provides a panhead including a fixed portion that is fixedly installed and a movable portion that is equipped with an image pickup unit, which picks up images, and is movable together with the image pickup unit with respect to the fixed portion, the panhead comprising a first communication section configured to include a first moving-rotationally portion that communicably connects the fixed portion side and the movable portion side and, when the movable portion moves, is able to move rotationally along with a movement of the movable portion, and a second communication section configured to include a second moving-rotationally portion that communicably connects the fixed portion side and the movable portion side in a non-contact state and, when the movable portion moves, is able to move rotationally around the same axis as the first moving-rotationally portion along with a movement of the movable portion. The second moving-rotationally portion includes a hollow portion in which at least a portion of the first moving-rotationally portion is disposed.

According to the present invention, it is possible to achieve the cost reduction and the miniaturization.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Hereinafter, a preferred embodiment of the present invention will be described in detail with reference to the drawings. However, the configuration described in the following preferred embodiment is merely an example, and the scope of the present invention is not limited by the configuration described in the following preferred embodiment. For example, each component constituting the present invention can be replaced with a component having any configuration capable of exhibiting a similar function. In addition, any component may be added.

Figure 1:
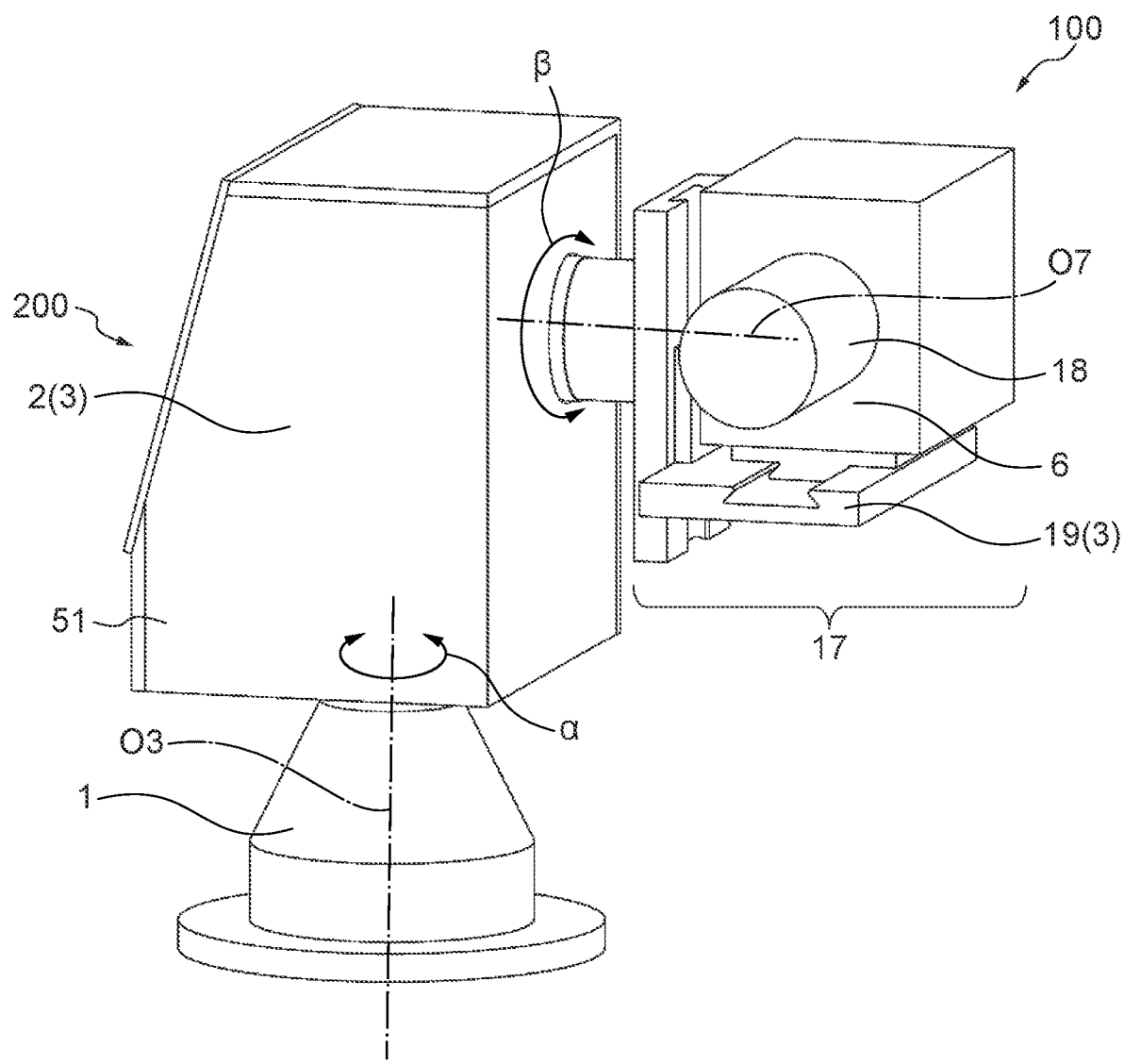
FIG. 1 is an external appearance perspective view of an image pickup apparatus that includes a panhead.
Figure 2:
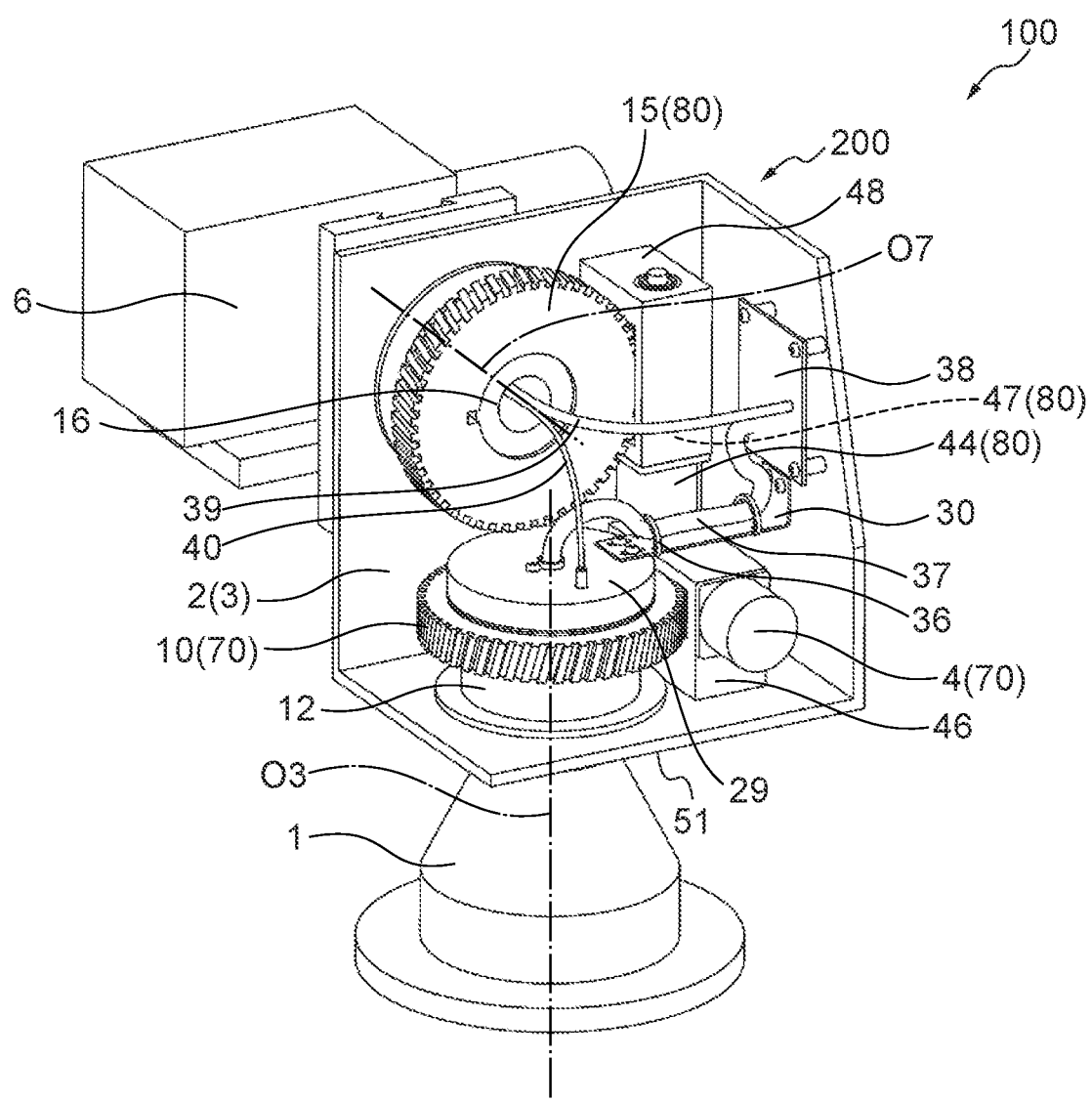
FIG. 2 is a perspective view that shows an internal configuration of the image pickup apparatus when viewed from a direction different from FIG. 1.

FIG. 1 is an external appearance perspective view of an image pickup apparatus 100 that includes a panhead 200. FIG. 2 is a perspective view that shows an internal configuration of the image pickup apparatus 100 when viewed from a direction different from FIG. 1. As shown in FIGS. 1 and 2, the image pickup apparatus 100 includes the panhead (an electric panhead) 200 and a camera (an image pickup unit) 6 that is mounted on the panhead 200. The panhead 200 includes a fixed base (a fixed portion) 1 and a movable portion 3 that includes a turning head 2 and a camera mount 19. The fixed base 1 is fixedly installed at a location where image pickup is required, such as a monitoring location. The camera 6 for picking up images is mounted on the camera mount 19. In this mounted state, the turning head 2 (the movable portion 3) is able to move rotationally about a pan rotation axis O3 with respect to the fixed base 1 together with the camera 6, that is, the turning head 2 (the movable portion 3) is movable around the pan rotation axis O3 with respect to the fixed base 1 together with the camera 6.

The turning head 2 includes a housing 51 and a pan shaft motor 4 that is housed in the housing 51. The turning head 2 is able to move rotationally in a direction of an arrow a, which is a direction around the pan rotation axis O3, by the operation of the pan shaft motor 4. It should be noted that the pan rotation axis O3 is preferably parallel to a vertical direction. Thereby, the camera 6 is able to be turned in a pan direction (a horizontal direction) and an image pickup direction is able to be set to an arbitrary azimuthal angle. In addition, in the preferred embodiment, the turning head 2 is able to rotate the camera 6 in a direction of an arrow B, which is a direction around a tilt rotation axis O7 orthogonal to the pan rotation axis O3. Thereby, the camera 6 is able to be turned in a tilt direction (an up-down direction) and the image pickup direction is able to be set to an arbitrary elevation angle. Furthermore, by appropriately combining the turning in the pan direction and the turning in the tilt direction, it is possible to arbitrarily adjust both the azimuthal angle and the elevation angle. In the image pickup apparatus 100, the adjustment of the azimuthal angle and the adjustment of the elevation angle, that is, moving rotationally about the pan rotation axis O3 and moving rotationally about the tilt rotation axis O7 are performed by remote control.

Figure 3:
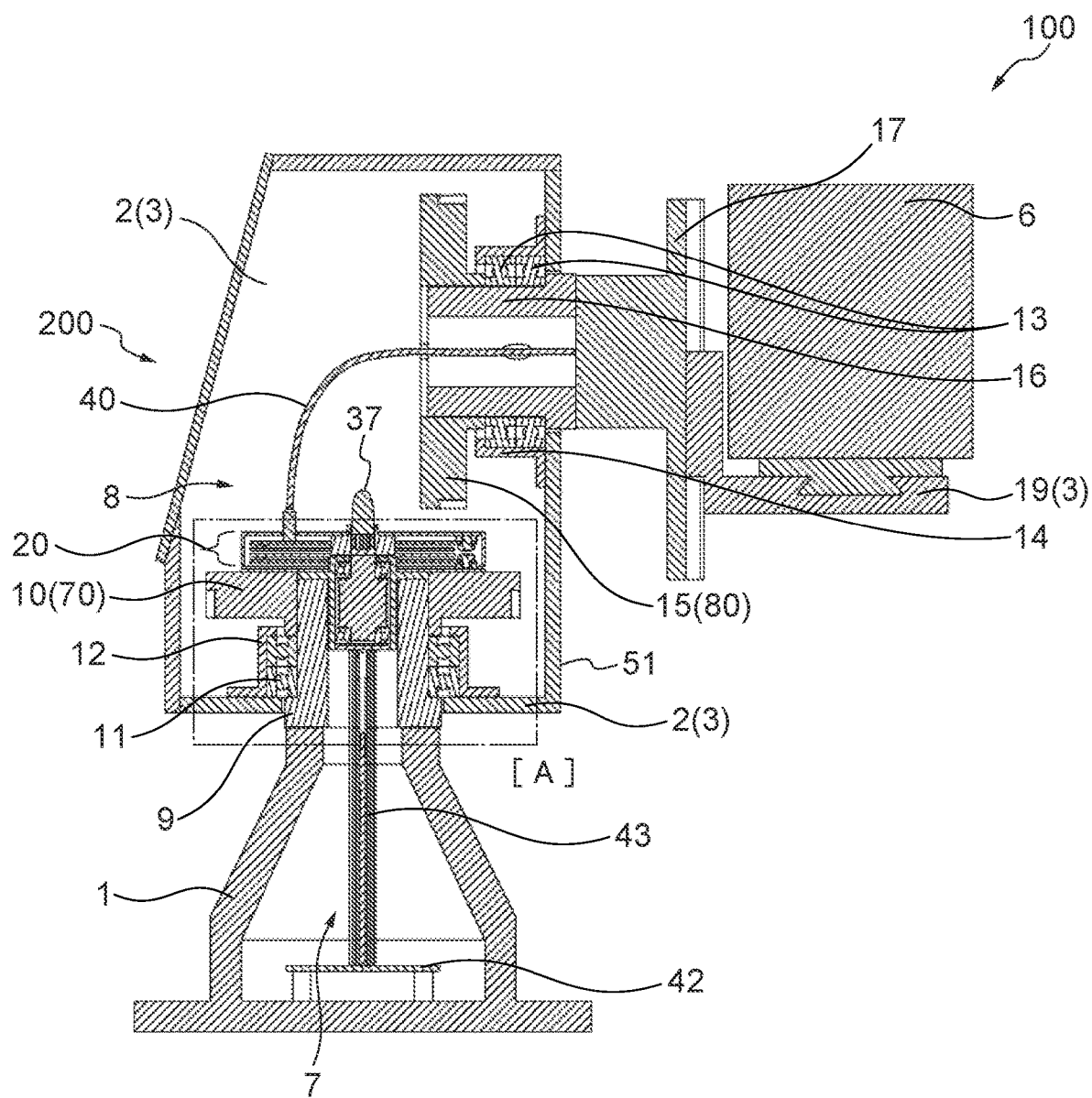
FIG. 3 is a sectional view of the image pickup apparatus taken along a plane that includes a pan rotation axis and a tilt rotation axis.
Figure 4:
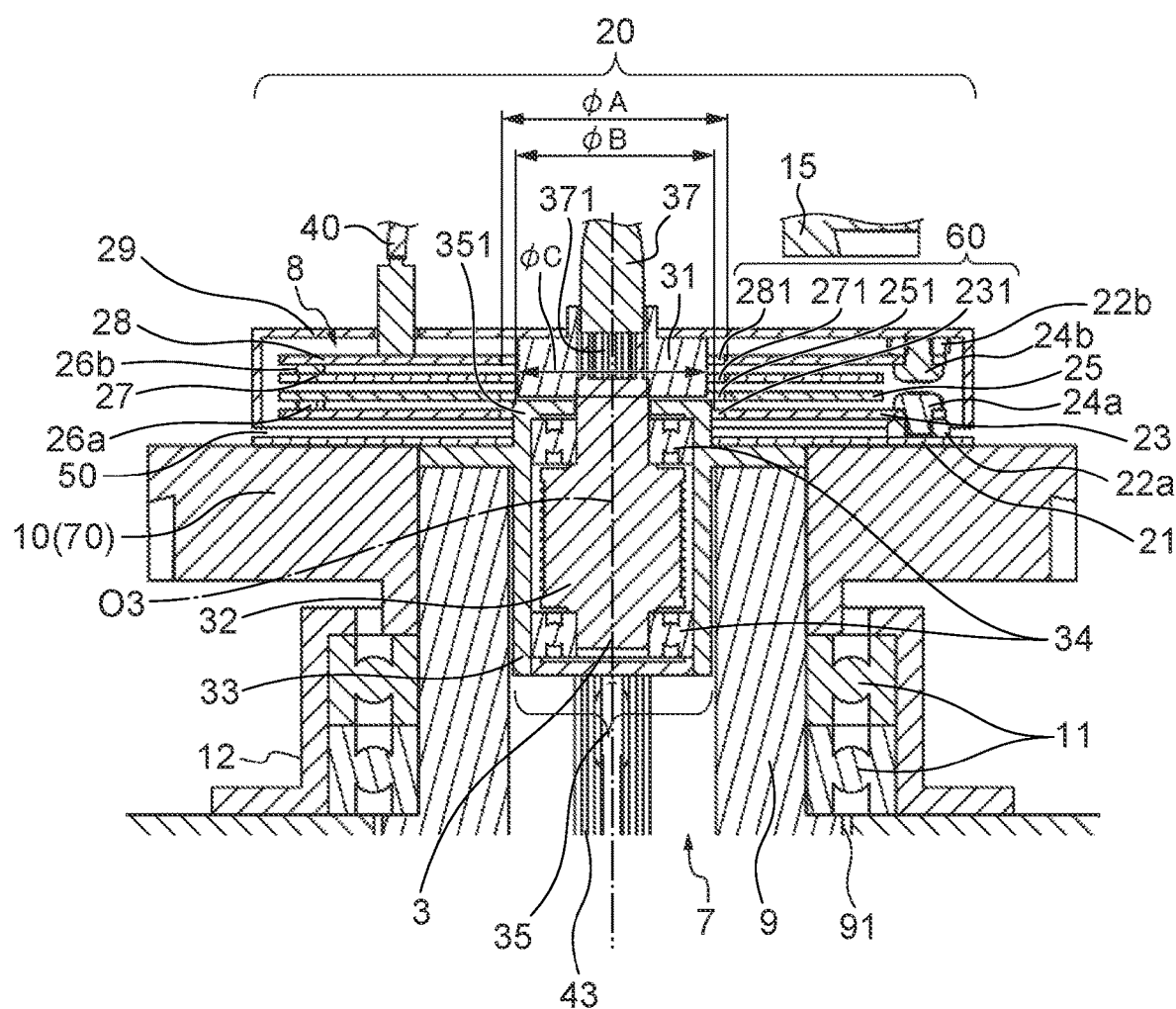
FIG. 4 is an enlarged view of a region [A] surrounded by an alternate long and short dash line shown in FIG. 3.
Figure 5:
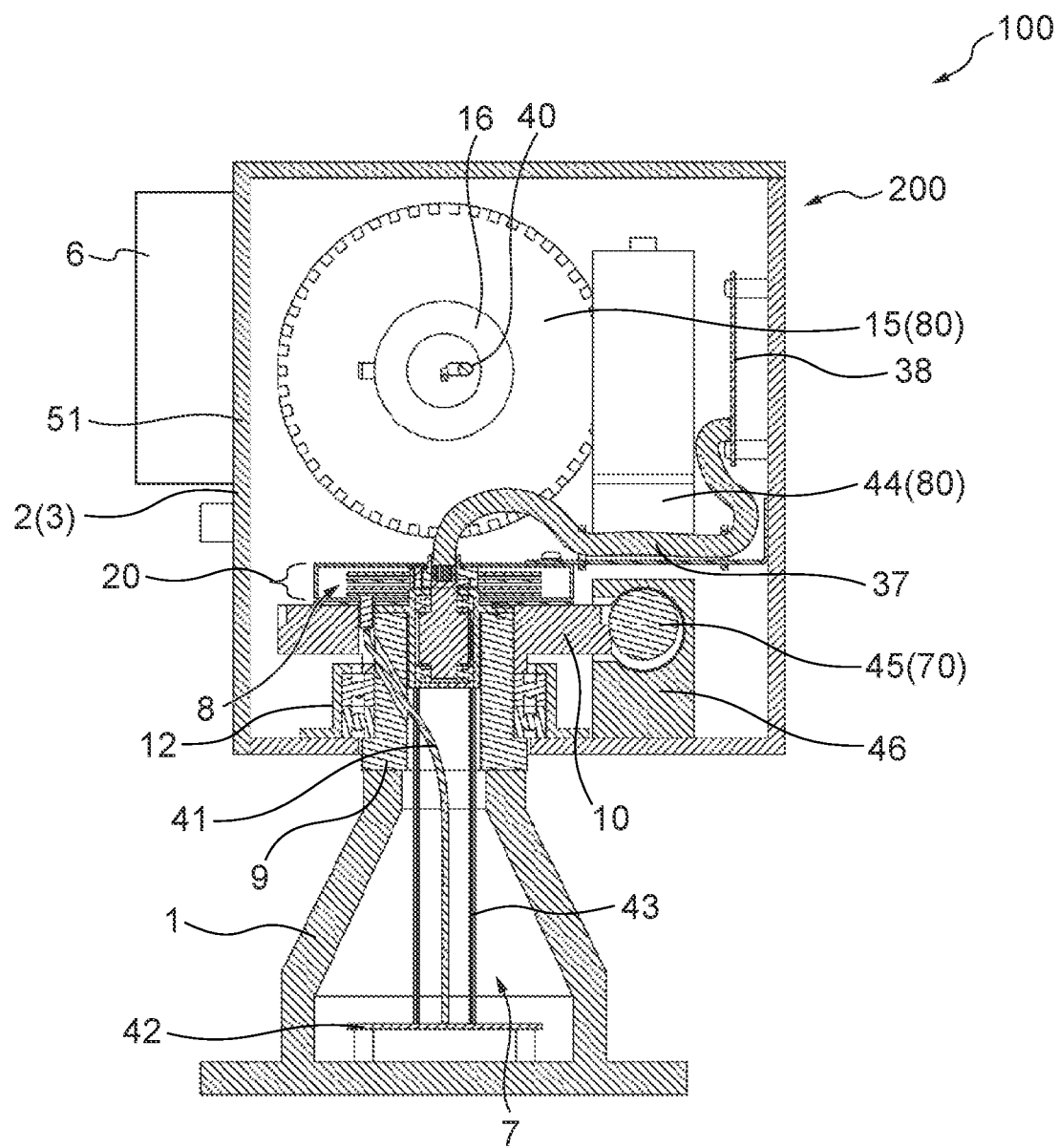
FIG. 5 is a sectional view of the image pickup apparatus taken along a plane that includes the pan rotation axis and is perpendicular to the tilt rotation axis.

FIG. 3 is a sectional view of the image pickup apparatus 100 taken along a plane that includes the pan rotation axis O3 and the tilt rotation axis O7. FIG. 4 is an enlarged view of a region [A] surrounded by an alternate long and short dash line shown in FIG. 3. FIG. 5 is a sectional view of the image pickup apparatus 100 taken along a plane that includes the pan rotation axis O3 and is perpendicular to the tilt rotation axis O7. As shown in FIG. 3, the fixed base 1 has a hollow truncated cone shape, and a pan main shaft 9 having a cylindrical shape is provided at the top (an upper portion) of the fixed base 1. A pan shaft worm wheel 10 is concentrically fixed to an upper portion of an outer circumference portion of the pan main shaft 9. Furthermore, as shown in FIG. 4, between a flange portion 91 of a lower portion of the pan main shaft 9 and the pan shaft worm wheel 10, two pan shaft bearings 11 are disposed side by side in the up-down direction, that is, the two pan shaft bearings 11 are disposed side by side along the pan rotation axis O3. It should be noted that each pan shaft bearing 11 is fitted into the outer circumference portion of the pan main shaft 9. In addition, the two pan shaft bearings 11 are collectively pressed against the bottom of the housing 51 of the turning head 2 by a pan shaft bearing presser 12. As a result, the turning head 2 becomes a state, in which the turning head 2 can move rotationally around the pan rotation axis O3 with respect to the fixed base 1 and the degrees of freedom other than the moving rotationally around the pan rotation axis O3 are restricted.

As shown in FIG. 3, a tilt main shaft 16 having a cylindrical shape is supported horizontally (parallel to a left-right direction in FIG. 3) on a side portion (a side wall) of the housing 51 of the turning head 2. A tilt shaft worm wheel 15 is fixed to an outer circumference portion of the tilt main shaft 16. In addition, a camera turning portion 17 including the camera mount 19 is fixed to the opposite side of the tilt shaft worm wheel 15 of the tilt main shaft 16. Furthermore, two tilt shaft bearings 13 are fitted into the outer circumference portion of the tilt main shaft 16 in a state, in which the two tilt shaft bearings 13 are disposed side by side in the left-right direction. The two tilt shaft bearings 13 are located between the tilt shaft worm wheel 15 and the side portion of the housing 51. In addition, the two tilt shaft bearings 13 are collectively pressed against the side portion of the housing 51 of the turning head 2 by a tilt shaft bearing presser 14. As a result, the camera turning portion 17 becomes a state, in which the camera turning portion 17 can move rotationally together with the camera mount 19 around the tilt rotation axis O7 and the degrees of freedom other than the moving rotationally around the tilt rotation axis O7 are restricted. By the camera turning portion 17 moving rotationally around the tilt rotation axis O7, it is possible to change the elevation angle of the camera 6 mounted on the camera mount 19. The camera mount 19 is configured to be able to adjust the position of the camera 6 in an optical axis direction of a lens 18 of the camera 6, that is, in a front-back direction, and in the vertical direction, that is, in the up-down direction.

The camera 6 receives the supply of control signals and power from external devices, and outputs video signals of a subject that are picked up through the lens 18. Therefore, it is necessary to provide signal and power transmission paths between the camera 6 and the external devices. In the preferred embodiment, as the signal and power transmission paths, the image pickup apparatus 100 (the panhead 200) includes a first communication section 7 that communicably connects the fixed base 1 (the external device) side and the movable portion 3 side, and a second communication section 8 that communicably connects the fixed base 1 (the external device) side and the movable portion 3 side. Here, "communication" includes at least one of signal transmission and power transmission. The first communication section 7 includes a slip ring 35 functioning as a first moving-rotationally portion that communicably connects the fixed base 1 side and the movable portion 3 side and, when the movable portion 3 moves, is able to move rotationally along with the movement of the movable portion 3. The slip ring 35 will be described below.

The second communication section 8 is configured to be capable of performing transmission of electrical signals between the camera mount 19 and the turning head 2 and transmission of electrical signals between the fixed base 1 and the turning head 2 (the movable portion 3). In addition, in the preferred embodiment, since the camera mount 19 normally move rotationally only about ±90 degrees at most with respect to the turning head 2, a harness (a cable) can be used to perform the transmission of the electrical signals. On the other hand, since the turning head 2 turns endlessly with respect to the fixed base 1, that is, since the turning head 2 is capable of unlimited moving rotationally with no restriction on the moving-rotationally limit, it is preferable that a method different from the harness is used for performing the transmission of the electrical signals. Therefore, in the preferred embodiment, a wireless communication unit 20 is used to perform the transmission of the electrical signals, and respective components constituting the wireless communication unit 20 are located on the fixed base 1 side and the turning head 2 side, respectively. The wireless communication unit 20 functions as a second moving-rotationally portion that communicably connects the fixed base 1 side and the movable portion 3 side in a non-contact state and, when the turning head 2 moves, is able to move rotationally around the pan rotation axis O3 along with the movement of the turning head 2. As a result, it becomes possible to perform the transmission of the electrical signals (the video signals and the control signals) between the fixed base 1 and the turning head 2.

The wireless communication unit 20 includes a board fixing plate 21 that is made of metal, spacers 22a and 22b that are made of metal, a fixed side wireless conversion board 23, board fixing screws 24a and 24b, a fixed side antenna board (a stationary board) 25, and inter-board connectors 26a and 26b. In addition, the wireless communication unit 20 includes a rotating side antenna board (a moving-rotationally board) 27 having a disc shape, a rotating side wireless conversion board 28, a board fixing plate 29 that is made of metal, and a rotation transmission guide 30. On an upper side of the pan shaft worm wheel 10, in order from the fixed base 1 side (a lower side) to the turning head 2 side (an upper side), the board fixing plate 21, the fixed side wireless conversion board 23, the fixed side antenna board 25, and the rotating side antenna board 27, and the rotating side wireless conversion board 28 are disposed. Furthermore, circuit patterns (not shown) having conductivity are formed on the board fixing plate 21, the fixed side wireless conversion board 23, the fixed side antenna board 25, the rotating side antenna board 27, and the rotating side wireless conversion board 28, respectively. In addition, the board fixing plate 21, the fixed side wireless conversion board 23, the fixed side antenna board 25, the rotating side antenna board 27, and the rotating side wireless conversion board 28 are disposed apart from each other. Moreover, the board fixing plate 21, the fixed side wireless conversion board 23, the fixed side antenna board 25, the rotating side antenna board 27, and the rotating side wireless conversion board 28 have a disc shape, respectively.

The spacer 22a is caulked and fixed to the board fixing plate 21 disposed on the fixed side. The fixed side wireless conversion board 23 is fixed to the spacer 22a via the board fixing screw 24a. The fixed side antenna board 25 is connected to the fixed side wireless conversion board 23 via the inter-board connector 26a. The inter-board connector 26a is disposed between the fixed side wireless conversion board 23 and the fixed side antenna board 25. In addition, the board fixing plate 29 disposed on the rotating side (the moving-rotationally side) has a box shape (a cup shape), and the spacer 22b is caulked and fixed to the inside of the board fixing plate 29. The rotating side wireless conversion board 28 is fixed to the spacer 22b via the board fixing screw 24b. The rotating side antenna board 27 is connected to the rotating side wireless conversion board 28 via the inter-board connector 26b. The rotating side antenna board 27 is disposed to face the fixed side antenna board 25 in a non-contact state. Thereby, in the wireless communication unit 20, between the fixed side antenna board 25 and the rotating side antenna board 27, the moving-rotationally limit is not restricted and electric field communication (electromagnetic field coupling) becomes possible. As a result, the wireless communication unit 20 is able to communicably connect the fixed base 1 side and the movable portion 3 side in a non-contact state regardless of the image pickup direction of the camera 6. The inter-board connector 26b is disposed between the rotating side wireless conversion board 28 and the rotating side antenna board 27. Further, as shown in FIG. 2, the board fixing plate 29 is connected to the side portion of the housing 51 of the turning head 2 via the rotation transmission guide 30. As a result, when the turning head 2 turns around the pan rotation axis O3, since the rotating side antenna board 27 is fixed to the board fixing plate 29, the rotating side antenna board 27 moves rotationally along with the turning around the pan rotation axis O3 of the turning head 2, but the fixed side antenna board 25 is fixed to the fixed base 1 and therefore does not move rotationally.

A ground line is electrically connected to the rotating side wireless conversion board 28. The rotating side wireless conversion board 28 and the rotating side antenna board 27 are electrically connected to ground lines. Each ground line is indirectly electrically connected to the casing 51 of the turning head 2. Further, the board fixing plate 21 is fixed to the pan shaft worm wheel 10 that is made of metal via metal screws. The pan shaft worm wheel 10 is fixed to the pan main shaft 9 that is made of metal via metal screws. The pan main shaft 9 is fixed to the fixed base 1 that is made of metal via metal screws. Ground lines are electrically connected to the fixed side wireless conversion board 23 and the board fixing plate 21 that is disposed on the fixed side. Each ground line is indirectly electrically connected to the fixed base 1. It should be noted that the board fixing plate 29 may be formed integrally with the pan shaft worm wheel 10, but by configuring the board fixing plate 29 separately from the pan shaft worm wheel 10, the ease of assembling the image pickup apparatus 100 is improved.

Further, as described above, the board fixing plate 29 has the box shape. Thereby, the fixed side wireless conversion board 23, the fixed side antenna board 25, the rotating side antenna board 27, and the rotating side wireless conversion board 28 are able to be housed inside the board fixing plate 29. Further, a gap 50 between the board fixing plate 29 and the board fixing plate 21, that is, the closest distance can be set to be as small as 1 mm or less. With such a configuration, it is possible to suppress the influence of electromagnetic waves that the rotating side antenna board 27 and the fixed side antenna board 25 receive from surrounding motors, etc., and therefore it is possible to transmit the video signals while maintaining the quality of the video signals. It should be noted that the frequency of the video signals in the preferred embodiment is not particularly limited, but for example, preferably a frequency band of 1 GHz or more and 2 GHz or less is used, and more preferably a frequency band of 1.5 GHz or more and 2 GHz or less is used. Further, the main frequency of the control signals is not particularly limited, but for example, preferably a frequency band of 1 MHz or more and 2 MHz or less is used. Therefore, in the image pickup apparatus 100, the thickness of plate members constituting the board fixing plate 29 and the board fixing plate 21 and the size of the gap 50 are set so as to shield the electromagnetic waves in a frequency band of 1 MHz or more and 2 GHz or less. Further, since the board fixing plate 29 and the board fixing plate 21 also serve as an electromagnetic shield, it is possible to omit providing a separate electromagnetic shield. As a result, it is possible to prevent an increase in the number of parts of the image pickup apparatus 100, and thus it is possible to contribute to reducing the manufacturing cost of the image pickup apparatus 100.

The transmission path of the video signals will be described in detail. As shown in FIGS. 3 and 4, the second communication section 8 includes a rotating side harness (a second movable portion side cable) 40 that is connected to the rotating side antenna board 27 via the rotating side wireless conversion board 28 and extends toward the movable portion 3 side. The rotating side harness 40 is connected to the camera 6 on the movable portion 3 side. As shown in FIG. 5, the second communication section 8 includes a fixed side harness (a second fixed portion side cable) 41 that is connected to the fixed side antenna board 25 via the fixed side wireless conversion board 23 and extends toward the fixed base 1 side, and a fixed base board 42 that is connected to the fixed side harness 41. Serial digital interface (SDI) video signals outputted from the camera 6 are transmitted to the rotating side wireless conversion board 28 via the rotating side harness 40. Thereafter, the SDI video signals are converted into voltage waveforms for wireless transmission by means of the rotating side wireless conversion board 28 and are transmitted to the rotating side antenna board 27. As described above, the electric field communication (the electromagnetic field coupling) is possible between the rotating side antenna board 27 and the fixed side antenna board 25. Thereby, the voltage waveforms for wireless transmission that are transmitted to the rotating side antenna board 27 can also be generated as it is on the fixed side antenna board 25. Then, the voltage waveforms generated on the fixed side antenna board 25 are reconverted into video signals by means of the fixed side wireless conversion board 23. The reconverted video signals are transmitted to the fixed base board 42 via the fixed side harness 41. In the fixed base board 42, the video signals are converted into optical signals or the like and are outputted to the outside from a video signal output terminal (not shown). It should be noted that the fixed side harness 41 is inserted through the fixed base 1 and the fixed base board 42 is disposed within the fixed base 1.

The transmission path of the control signal will be described. A serial communication control signal supplied from an external device (a controller) is inputted from a control signal input terminal (not shown) provided on the fixed base 1. The control signal is inputted into the fixed side wireless conversion board 23 via the fixed side harness 41. The control signal inputted into the fixed side wireless conversion board 23 is converted from a voltage signal for serial communication to a voltage waveform for wireless transmission. Then, through the electric field communication between the fixed side antenna board 25 and the rotating side antenna board 27, the voltage waveform generated on the rotating side antenna board 27 is reconverted into a voltage signal for serial communication by means of the rotating side wireless conversion board 28. The reconverted serial communication signal is supplied to the camera 6 via the rotating side harness 40. As a result, the camera 6 is controlled and imaging pickup becomes possible. In this way, the second communication section 8 (the wireless communication unit 20) takes charge of two-way communication transmission that includes communication transmission from the camera 6 side and communication transmission to the camera 6 side. It should be noted that the operating power for the wireless communication unit 20 is supplied from, for example, the fixed base board 42 or a turning head board 38. The turning head board 38 is disposed within the housing 51 of the turning head 2.

Furthermore, in the preferred embodiment, the first communication section 7 also takes charge of the power transmission. As described above, the first communication section 7 includes the slip ring 35. As shown in FIG. 4, the slip ring 35 includes a conductor ring portion (a rotating body) 32, a brush portion (a stationary body) 33, and bearings (bearings within the slip ring) 34. The conductor ring portion 32 is connected and fixed to the board fixing plate 29 via a coupling 31. The brush portion 33 has a cylindrical shape, is inserted into the pan main shaft 9, and is fixed. The conductor ring portion 32 configured by stacking a plurality of conductor rings for power transmission is disposed inside the brush portion 33. Furthermore, inside the brush portion 33, the bearings 34 are disposed above and below the conductor ring portion 32. Each bearing 34 fits into an outer circumference portion of the conductor ring portion 32 and fits into an inner circumference portion of the brush portion 33. Thereby, the conductor ring portion 32 is able to move rotationally inside the brush portion 33 around the pan rotation axis O3 in a state where the moving-rotationally limit is not restricted. Similar to the conductor ring portion 32 (the slip ring 35), the wireless communication unit 20 is also able to move rotationally around the pan rotation axis O3 in the state where the moving-rotationally limit is not restricted. As a result, the turning head 2 (the movable portion 3) becomes capable of unlimited moving rotationally with no restriction on the moving-rotationally limit with respect to the fixed base 1 around the same axis as the slip ring 35 and the wireless communication unit 20, that is, around the pan rotation axis O3. Thereby, it is possible to quickly set the image pickup direction of the camera 6 mounted on the turning head 2 to an arbitrary azimuthal angle via the camera mount 19. In addition, a brush that is made of metal is provided on the inner circumference portion of the brush portion 33. Furthermore, when the conductor ring portion 32 moves rotationally around the pan rotation axis O3, an outer circumference portion of each conductor ring slides on the brush of the brush portion 33. As a result, the slip ring 35 is able to communicably connect the fixed base 1 side and the movable portion 3 side in a contact state regardless of the image pickup direction of the camera 6.

As described above, inside the brush portion 33, the bearings 34 are disposed above and below the conductor ring portion 32. Each bearing 34 is configured separately from the pan shaft bearing 11. As a result, even in the case that a rotation center of the pan shaft bearing 11 is misaligned with respect to a rotation center of the wireless communication unit 20, rotation centers of the rotating side antenna board 27 and the fixed side antenna board 25 will be aligned by the bearings 34. Thereby, it is possible to transmit the signals while a S/N ratio remains high.

In the panhead 200, an inner circumference portion of the board fixing plate 29 and an outer circumference portion of the coupling 31 are fitted together, an inner circumference portion of the coupling 31 and the outer circumference portion of the conductor ring portion 32 are fitted together, and the outer circumference portion of the conductor ring portion 32 and an inner circumference portion of the bearing 34 are fitted together. In addition, in the panhead 200, the rotating side antenna board 27 can be assembled by screwing the rotating side antenna board 27 to the board fixing plate 29 while adjusting the mounting position so that the center of the rotating side antenna board 27 and the center of the board fixing plate 29 coincide with each other. As a result, a rotation center of the bearing 34 and a rotation center of the rotating side antenna board 27 can be aligned, and therefore the eccentricity of the rotation center of the rotating side antenna board 27 can be suppressed. Similarly, in the panhead 200, an inner circumference portion of the board fixing plate 21 and an outer circumference portion of the brush portion 33 are fitted together, the inner circumference portion of the brush portion 33 and an outer circumference portion of the bearing 34 are fitted together, and assembling is performed so that the center of the fixed side antenna board 25 and the center of the board fixing plate 21 coincide with each other. As a result, the rotation center of the bearing 34 and a rotation center of the fixed side antenna board 25 can be aligned. In addition, by means of the bearing 34, it is possible to suppress a misalignment between a rotation center of the conductor ring portion 32 and a rotation center of the brush portion 33, and therefore, stable power supply is also possible. It should be noted that the coupling 31 may be configured by an Oldham coupling capable of absorbing the eccentricity of the rotation center. In the preferred embodiment, as will be described below, since the rotation transmission guide 30 has a function of absorbing the eccentricity of the rotation center, a rigid type coupling, which is cheaper than the Oldham coupling, is used as the coupling 31. A conductor ring portion harness (a first movable portion side cable) 37 connected to the conductor ring portion 32 is supported by the coupling 31. The conductor ring portion harness 37 extends toward the turning head board 38 (the movable portion 3) and is connected to the turning head board 38.

As shown in FIG. 2, the rotation transmission guide 30 is configured by a metal sheet bent into an L shape, one end side thereof is fixed to the casing 51 of the turning head 2 with screws, and the other end side is fixed to the board fixing plate 29 with screws. Thereby, when the turning head 2 turns, the board fixing plate 29 is also able to move rotationally together with the housing 51 of the turning head 2. The conductor ring portion harness 37 is fastened by a tie wrap (a binding band) 36 and is fixed to the rotation transmission guide 30. As a result, even in the case that the turning head 2 turns, it is possible to prevent the conductor ring portion harness 37 from being misaligned on the rotation transmission guide 30, that is, the conductor ring portion harness 37 is stably placed on the rotation transmission guide 30. It should be noted that the board fixing plate 29 and the rotation transmission guide 30 are fixed to each other, for example, with play due to the spacer, that is, in a floating state. As a result, even in the case that the pan shaft worm wheel 10 is disposed eccentrically with respect to the pan shaft bearing 11, when the turning head 2 turns, the wireless communication unit 20 is able to smoothly follow and move rotationally.

As shown in FIG. 2, in the state that the camera 6 is mounted on the camera mount 19, a video signal input terminal (not shown), a control signal output terminal (not shown), and a camera power terminal (not shown) that are provided on the turning head board 38 are each connected to the camera 6 via a camera harness 39. As described above, in the preferred embodiment, the camera mount 19 normally move rotationally only about ±90 degrees at most with respect to the turning head 2. In such a moving-rotationally angle range, the camera harness 39, which is a wired connection, can be used to connect the turning head board 38 and the camera 6.

As shown in FIGS. 4 and 5, a brush portion harness (a first fixed portion side cable) 43 is connected to the brush portion 33. The brush portion harness 43 extends toward the fixed base board 42 (the fixed base 1) side and is connected to the fixed base board 42. In addition, an external device (not shown) that serves as an electric power supply source is connected to the fixed base board 42. As a result, the electric power from the external device is supplied to the turning head board 38 via the fixed base board 42, the brush portion harness 43, the slip ring 35, and the conductor ring portion harness 37 in this order. Then, the electric power is supplied from the turning head board 38 to the pan shaft motor 4 and a tilt shaft motor 44.

Next, a turning drive mechanism 70 of the turning head 2 and a vertical swing drive mechanism (an elevation angle drive mechanism) 80 of the camera mount 19 will be described. As shown in FIGS. 2 and 5, the turning drive mechanism 70 includes the pan shaft motor 4, a pan shaft worm 45 attached to a rotating shaft of the pan shaft motor 4, and the pan shaft worm wheel 10 attached to the pan main shaft 9. The pan shaft motor 4 is fixed to the turning head 2 via a pan shaft gear box 46. The pan shaft worm 45 and the pan shaft worm wheel 10 mesh with each other. In addition, when the pan shaft motor 4 operates, its driving force is transmitted to the turning head 2 via the pan shaft worm 45 and the pan shaft worm wheel 10. As a result, the turning head 2 is able to move rotationally around the pan rotation axis O3, and thus the azimuthal angle of the camera 6 can be controlled remotely.

As shown in FIG. 2, the vertical swing drive mechanism 80 includes the tilt shaft motor 44, a tilt shaft worm 47 attached to a rotating shaft of the tilt shaft motor 44, and the tilt shaft worm wheel 15 attached to the tilt main shaft 16. The tilt shaft motor 44 is fixed to the turning head 2 via a tilt shaft gear box 48. The tilt shaft worm 47 and the tilt shaft worm wheel 15 mesh with each other. In addition, when the tilt shaft motor 44 operates, its driving force is transmitted to the camera mount 19 via the tilt shaft worm 47 and the tilt shaft worm wheel 15. As a result, the camera mount 19 is able to move rotationally around the tilt rotation axis O7, and thus the elevation angle of the camera 6 can be controlled remotely.

Electrical connection between the fixed base 1 and the turning head 2 during the remote control of the azimuthal angle is provided by an electromagnetic field coupling method in the wireless communication unit 20 in the signal system, and is provided by a sliding contact method in the slip ring 35 in the power supply system. As a result, as for pan turning, endless turning becomes possible. Furthermore, by connecting the control signal input terminal and the video signal output terminal to an external device via a cable, it is possible to monitor the video of the subject picked up by the camera 6. In addition, by turning the camera 6 by remote control, it is possible to monitor the video of the subject in an arbitrary azimuth. In this manner, in the image pickup apparatus 100, it is possible to endlessly and remotely control the azimuthal angle of the camera 6 mounted on the camera mount 19, and it is also possible to remotely control the elevation angle of the camera 6. As a result, for example, in the case that the image pickup apparatus 100 is used as a surveillance camera at an airport or the like, it is possible to stably and reliably continue to perform imaging pickup of an aircraft turning in the sky, which is an imaging pickup target, regardless of the number of times of turning or the course of the aircraft.

Next, a positional relationship between the wireless communication unit 20 and the slip ring 35 will be described. As described above, the wireless communication unit 20 includes the fixed side wireless conversion board 23, the fixed side antenna board 25, the rotating side antenna board 27, and the rotating side wireless conversion board 28. As shown in FIG. 4, a through hole 231 having a circular shape is formed at a center portion of the fixed side wireless conversion board 23. Furthermore, a through hole 251 having a circular shape is formed at a center portion of the fixed side antenna board 25. Moreover, a through hole 271 having a circular shape is formed at a center portion of the rotating side antenna board 27. In addition, a through hole 281 having a circular shape is formed at a center portion of the rotating side wireless conversion board 28. In the wireless communication unit 20, the through hole 231, the through hole 251, the through hole 271, and the through hole 281 collectively constitute one hollow portion 60.

Further, an outer diameter φB of a tip portion 351 of the slip ring 35 is smaller than an inner diameter φA of the hollow portion 60. Thereby, the tip portion 351 (a portion) of the slip ring 35 can be inserted into a lower side of the hollow portion 60, and the slip ring 35 can be disposed concentrically with the hollow portion 60. In addition, a tip portion 371 of the conductor ring portion harness 37 is connected to the coupling 31. Similarly to the outer diameter φB of the tip portion 351, an outer diameter QC of the coupling 31 is smaller than the inner diameter φA of the hollow portion 60. Thereby, the tip portion 371 (a portion) of the conductor ring portion harness 37 can be inserted into an upper side of the hollow portion 60 together with the coupling 31, and the conductor ring portion harness 37 can be disposed concentrically with the hollow portion 60. In this way, the tip portion 351 of the slip ring 35 is disposed on the lower side of the hollow portion 60, and the tip portion 371 of the conductor ring portion harness 37 is disposed on the upper side of the hollow portion 60. That is, when viewed from a direction of the pan rotation axis O3 (top view or bottom view) and when viewed from a direction perpendicular to the pan rotation axis O3 (side view), in the hollow portion 60, the tip portion 351 of the slip ring 35 and the tip portion 371 of the conductor ring portion harness 37 overlap. Therefore, the hollow portion 60 functions as a space for arranging the tip portion 351 of the slip ring 35 and the tip portion 371 of the conductor ring portion harness 37. For example, compared to a case that the wireless communication unit 20 and the slip ring 35 are disposed apart from each other in the direction of the pan rotation axis O3, such a positional relationship is able to achieve the miniaturization of the image pickup apparatus 100 (the panhead 200), that is, space saving of the image pickup apparatus 100 (the panhead 200).

In addition, since it is not necessary to perform hollowing of the slip ring 35 (on the other hand, in the related art, for example, in the signal transmission device disclosed in Japanese Laid-Open Patent Publication (kokai) No. 2013-34043 and in the camera device disclosed in Japanese Patent No. 4916726, it is necessary to perform hollowing of the slip ring), the slip ring 35 can be made smaller (smaller in diameter), and as a result, it becomes possible to achieve the cost reduction of the image pickup apparatus 100 (the panhead 200) including the slip ring 35. Furthermore, the wireless communication unit 20 can be manufactured by using general base materials (general circuit board materials). Thereby, the wireless communication unit 20 can reduce the component cost compared to the slip ring 35 whose terminals are made of noble metal. In addition, compared to a case that the slip ring 35 alone further has the same functions as the wireless communication unit 20, the configuration, in which the wireless communication unit 20 and the slip ring 35 are used together, makes it possible to realize the panhead 200 capable of endlessly rotating with the reduced manufacturing cost and the reduced component cost. Furthermore, high frequency video signals are transmitted by the wireless communication unit 20. Thereby, the slip ring 35 becomes able to handle only relatively low frequency signal transmission, and thus, it becomes possible to further reduce the component cost. In addition, since the signal transmission in the wireless communication unit 20 is a non-contact signal transmission, deterioration of the wireless communication unit 20 over time is suppressed and high durability is improved.

It should be noted that, in the preferred embodiment, although the tip portion 351 of the slip ring 35 is disposed in the hollow portion 60, it is sufficient that at least a portion of the slip ring 35 is disposed in the hollow portion 60. For example, depending on the size of the hollow portion 60 and the size of the slip ring 35, the entire slip ring 35 may be disposed in the hollow portion 60. In this case, the tip portion 371 of the conductor ring portion harness 37 is disposed at a position away from the hollow portion 60 together with the coupling 31.

Although the preferred embodiment of the present invention has been described above, the present invention is not limited to the above-described preferred embodiment, and various modifications and changes can be made within the scope of the invention. For example, an endless turning component similar to the turning drive mechanism 70 may be applied to the elevation angle drive mechanism 80. Furthermore, in the image pickup apparatus 100, it is also possible to partially replace the signals transmitted by the wireless communication unit 20 and the signals transmitted by the slip ring 35. In addition, the image pickup apparatus 100 may be configured such that the pan rotation axis O3 does not coincide with rotating shafts of the wireless communication unit 20 and the slip ring 35. Furthermore, although the fixed side wireless conversion board 23 and the fixed side antenna board 25 are configured as separate boards, the present invention is not limited to this, and for example, the fixed side wireless conversion board 23 and the fixed side antenna board 25 may be configured as one board, that is, they may be configured integrally. Similarly, although the rotating side antenna board 27 and the rotating side wireless conversion board 28 are configured as separate boards, the present invention is not limited to this, and for example, the rotating side antenna board 27 and the rotating side wireless conversion board 28 may be configured as one board, that is, they may be configured integrally.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-189307, filed on Nov. 28, 2022, which is hereby incorporated by reference herein in its entirety.

What is claimed is:

1. A panhead including a fixed portion that is fixedly installed and a movable portion that is equipped with an image capturing unit, which captures images, and is movable together with the image capturing unit with respect to the fixed portion, the panhead comprising:
   a first communication section configured to include a first moving-rotationally portion that communicably connects the fixed portion and the movable portion in a contact state and, when the movable portion moves, is able to move rotationally along with a movement of the movable portion; and
   a second communication section configured to include a second moving-rotationally portion that communicably connects the fixed portion and the movable portion in a non-contact state and, when the movable portion moves, is able to move rotationally around a same axis as the first moving-rotationally portion along with a movement of the movable portion, wherein the second moving-rotationally portion includes a hollow portion disposed at a position overlapping a rotational axis of the first moving-rotationally portion and the second moving-rotationally portion, and wherein at least a portion of the first moving-rotationally portion is disposed in the hollow portion in such a manner that the first moving-rotationally portion and the second moving-rotationally portion are able to rotate about a common axis as the movable portion rotates.

2. The panhead according to claim 1, wherein each of the first moving-rotationally portion and the second moving-rotationally portion has a moving-rotationally limit that is not restricted.

3. The panhead according to claim 1, wherein the first moving-rotationally portion is a slip ring that includes a stationary body having a cylindrical shape and a rotating body, which slides while moving rotationally inside the stationary body.

4. The panhead according to claim 3, wherein
the first communication section includes a first fixed portion cable that is connected to the stationary body and extends toward the fixed portion and a first movable portion cable that is connected to the rotating body and extends toward the movable portion, and
a portion of the first movable portion cable is disposed in the hollow portion.

5. The panhead according to claim 1, wherein the second moving-rotationally portion is capable of performing electric field communication.

6. The panhead according to claim 5, wherein
the second moving-rotationally portion includes a stationary board having conductivity, and a moving-rotationally board that is disposed so as to face and apart from the stationary board and has conductivity, and
the second moving-rotationally portion is capable of performing the electric field communication between the stationary board and the moving-rotationally board.

7. The panhead according to claim 6, wherein
a through hole is formed at a center portion of the stationary board,
a through hole is formed at a center portion of the moving-rotationally board, and
the through hole of the stationary board and the through hole of the moving-rotationally board constitute the hollow portion.

8. The panhead according to claim 6, wherein the second communication section includes a second fixed portion cable that is connected to the stationary board and extends toward the fixed portion and a second movable portion cable that is connected to the moving-rotationally board and extends toward the movable portion.

9. The panhead according to claim 1, wherein the second communication section is capable of performing communication of video signals with a frequency of 1 GHz or more.

10. The panhead according to claim 1, wherein the movable portion moves rotationally around the same axis as the first moving-rotationally portion and the second moving-rotationally portion.

11. An image capturing apparatus comprising:
the panhead according to claim 1; and
the image capturing unit mounted on the movable portion of the panhead.

* * * * *